US012182867B1

(12) United States Patent
Rose et al.

(10) Patent No.: US 12,182,867 B1
(45) Date of Patent: Dec. 31, 2024

(54) TRADING DIFFERENT ORDERS UTILIZING MINIMUM PROCESSING TIMES

(71) Applicant: Cboe Exchange, Inc., Chicago, IL (US)

(72) Inventors: Paul Rose, Olathe, KS (US); Cole Michael Chmielewski, Mission, KS (US)

(73) Assignee: Cboe Exchange, Inc., Chicago, IL (US)

( * ) Notice: Subject to any disclaimer, the term of this patent is extended or adjusted under 35 U.S.C. 154(b) by 0 days.

(21) Appl. No.: 18/623,324

(22) Filed: Apr. 1, 2024

Related U.S. Application Data

(60) Provisional application No. 63/494,608, filed on Apr. 6, 2023, provisional application No. 63/455,781, filed on Mar. 30, 2023.

(51) Int. Cl.
*G06Q 40/04* (2012.01)
(52) U.S. Cl.
CPC ................... *G06Q 40/04* (2013.01)
(58) Field of Classification Search
CPC .................................................... G06Q 40/04
See application file for complete search history.

(56) References Cited

U.S. PATENT DOCUMENTS 8,069,106 B2 * 11/2011 Waelbroeck ........... G06Q 40/04
705/37

FOREIGN PATENT DOCUMENTS

CA   2895354 C  *  8/2018  ............ G06Q 40/04
EP   3567541    * 11/2019  ............ G06Q 40/02

OTHER PUBLICATIONS

Banerjeee et al.: MTD-DHJS: Makespan-ptimized Task Scheduling Algorithm for Cloud Computing With Dynamic Computational Time Prediction, 2023, Digital Object Identifier, 100, pp. 105578-105618 (Year: 2023).*
Chen et al.: Online Schedulingof jobs with favourite machines, 2020, Computer and Operation Research, pp. 1-14 (Year: 2020).*
Oracle: Communications Orders and Service Management Modeling Guide, 2017, pp. 1-12 (Year: 2017).*

* cited by examiner

*Primary Examiner* — Bijendra K Shrestha
(74) *Attorney, Agent, or Firm* — Fish & Richardson P.C.

(57) ABSTRACT

An exchange computer system can implement a method to implement a minimum processing time to provide a more balanced and equitable environment for trading. The exchange computer system receives a first message related to an electronic order determines a first time at which the first message is received, and applies a time stamp indicative of the first time. A minimum processing time is determined for processing message(s) related to the electronic order. The exchange computer system determines whether a time elapsed from the first time satisfies the minimum processing time and blocks transmission of the first message until the time elapsed from the first time satisfies the minimum processing time. In some cases, the exchange computer system can also determine whether a second elapsed time from the first time satisfies the minimum processing time, and upon satisfaction, transmits the first message.

8 Claims, 10 Drawing Sheets

400A

Receiving from a user device remote to the exchange computer system a first message related to an electronic security transaction order
410

↓

Determining a first time at which the first message is received by the order routing system from the user device
420

↓

Applying, to the first message, a time stamp indicative of the first time
430

↓

Determining whether a first time elapsed from the first time satisfies a minimum processing time (MPT)
440

→ Yes

↓ No

In response to determining that the first time elapsed from the first time does not satisfy the MPT, blocking transmission of the first message
450

↓

Determining, by the order handling engine, that a second elapsed time from the first time satisfies the MPT after blocking transmission of the first message
460

↓

Transmitting, by the order handling engine, the first message to the matching engine
470

```
┌─────────────────────────────────────────────┐
│ Receiving from a user device remote to the  │
│ exchange computer system a second message   │
│ related to an electronic security           │
│ transaction order                           │
│ 415                                         │
└─────────────────────────────────────────────┘
                      ↓
┌─────────────────────────────────────────────┐
│ Determining a first time at which the       │
│ second message is received by the order     │
│ routing system from the user device         │
│ 425                                         │
└─────────────────────────────────────────────┘
                      ↓
┌─────────────────────────────────────────────┐
│ Applying a time stamp indicative of the     │
│ first time                                  │
│ 435                                         │
└─────────────────────────────────────────────┘
                      ↓
              ◇ Determining
         whether a first time elapsed
         from the first time satisfies a
         minimum processing time (MPT)
                    445                   → Yes
                      ↓ No
┌─────────────────────────────────────────────┐
│ Determining that the first time elapsed     │
│ from the first time does not satisfy the    │
│ MPT, blocking transmission of the           │
│ second message                              │
│ 455                                         │
└─────────────────────────────────────────────┘
                      ↓
┌─────────────────────────────────────────────┐
│ Determining that a second elapsed time      │
│ from the first time satisfies the MPT after │
│ blocking transmission of the second         │
│ message                                     │
│ 465                                         │
└─────────────────────────────────────────────┘
                      ↓
┌─────────────────────────────────────────────┐
│ Transmitting the second message to the      │
│ matching engine                             │
│ 475                                         │
└─────────────────────────────────────────────┘
```

FIG. 4B

TRADING DIFFERENT ORDERS UTILIZING MINIMUM PROCESSING TIMES

CROSS-REFERENCE TO RELATED APPLICATIONS

This application claims the benefit of U.S. Provisional Patent Application No. 63/455,781, filed Mar. 30, 2023, and 63/494,608, filed Apr. 6, 2023, which are each incorporated herein by reference in its entirety.

BACKGROUND

High volumes of financial instruments such as derivatives, stocks, and bonds are continuously traded at electronic exchanges, which enable trades to occur in real time through the algorithmic processing of orders and associated market information.

Generally, a trade may be executed when the price associated with a bid to purchase a financial instrument matches the price associated with an offer to sell the same instrument. Market participants typically price their bids and offers based on market conditions, which are subject to rapid change, and electronic exchanges often match bids and offers based on priority rules including price-time priority, and the principle of first-in, first-out (FIFO).

Within trading environments such as these, some market participants leverage sophisticated computer algorithms that can analyze market conditions and react to changes by placing large volumes of orders at relatively high speeds—typically, within fractions of a second of a detected change. The increased prevalence of algorithmic trading and the increased order flow associated with such practices has strained the computational resources of many electronic exchanges.

SUMMARY

The disclosure that follows relates to technology enabling an exchange computer system to better manage the high volume of orders that need to be processed through a method of trading and executing orders by implementing a minimum processing time that increases fair access to and latency equalization to messages or orders handled on the exchange computer system. The method reduces the disparity of order handler processing times that can arise from order handlers that process orders at different speeds. Accordingly, in some implementations, the method increases the exchange computer system's overall speed and efficiency.

For example, the exchange computer system reduces the disparity of order handler processing times and reduces the instances of "reordering" messages. By utilizing a minimum time processing (MPT) as described herein, the exchange computer system increases the number of messages that are sent to matching engines in the order in which they are received at the order handlers, thereby reducing message reordering. In this manner, implementing MPT can remove impediments to, and improve the mechanism of a free and open market and a national market system. As such, the MPT advantageously protects investors and the public interest.

Additionally, implementing the MPT can beneficially reduce or eliminate advantages that certain market participants may have due to the use of fast computers or algorithms that are capable of processing data and submitting orders at a rapid pace. In this manner, market participants who are unable to afford or incapable of using sophisticated, high speed computers are not disadvantaged in placing orders. By providing a fairer system of trading, MPT-implementing systems encourage greater participation and use by various users and market participants. In addition, at times of high volatility, the MPT mechanism can help reduce system overload and provide greater efficiency in the use of system resources by using dedicated order handlers that handle orders as described in this specification. In this manner, an exchange system that implements MPT can have significantly better performance than systems that do not implement MPT.

Equalizing the disparity in processing speeds between high-speed computers and less sophisticated computers may not always be resolvable with new hardware or hardware configurations. Accordingly, implementing the MPT as disclosed herein equalizes the processing times across distributed hardware and software components in a manner that is not achievable by improvements to hardware configurations or improvements to hardware. In fact, trading utilizing MPT addresses an issue that is rooted in the physical nature of hardware, which enables more sophisticated or high-speed computers or algorithms to "warm" the hardware components causing them to process messages received at the hardware components more quickly than hardware components that are not warm. This warming behavior enables market participants utilizing high-speed computers to process their messages (including orders) more quickly than market participants that do not or cannot utilize these warming tactics. Implementing MPT, reduces and substantially eliminates the advantage of market participants utilizing high-speed computers and/or algorithms in a manner that is not achievable by improving hardware alone.

Implementing MPT also enables small variations in processing time to be smoothed out. Even large MPT values (e.g., in terms of microseconds or milliseconds) do not significantly reduce the throughput for messages flowing through the exchange computer system (e.g., towards a matching engine), because messages received at the exchange computer system get credit for time spent waiting in the order handler (e.g., a network interface card (NIC)).

In some aspects of the disclosure, an exchange computer system is described. The system includes an order routing system configured to receive a first message from a user device over a computer network, which includes a network of interconnected electronic devices. The first message includes data indicative of an electronic security transaction order. An order matching system is configured to match a buy side and sale side of a purchase or sale of an asset in the electronic security transaction order. The system includes storage, configured to store data related to the first message. An order handling engine is configured to transmits the first message to the order matching system. The order handling engine is configured to: receive, at the system from the user device and through the order routing system, the first message related to the electronic security transaction order. The order handling engine determines a first time at which the first message is received by the order routing system from the user device. The order handling engine applies, at the first message, a time stamp indicative of the first time, and store, in the storage, a minimum processing time (MPT) for processing any message related to the electronic security transaction order at the order routing system. The order handling engine determines whether a time that has elapsed from the first time satisfies the MPT. Responsive to determining that the time elapsed from the first time does not satisfy the MPT, the order handling engine blocks transmission of the first message until the time elapsed from the first time satisfies the MPT. At the order handling engine determines a second elapsed time from the first time satisfies the MPT after blocking transmission of the first message. The order routing system transmits the first message to the order matching system in response to the second elapsed time satisfying the MPT.

In some implementations, the first message includes a plurality of parameters that include a type of order, and quote information for the purchase or sale of financial instrument. The second elapsed time is a hold time that when added to the first elapsed time equals the MPT.

In some implementations, the order handling engine is configured to: determine processing speeds of each order handler in a group of order handlers, and determine a slowest processing speed among the group of order handlers.

In some implementations, the slowest processing speed among the group of order handlers is utilized to determine the MPT.

In some implementations, the order handling engine is configured to electronically group, into one set, a group of order handlers. The order handling engine is configured to determine the MPT by comparing a processing time of each order handler within the group of order handlers.

In some implementations, responsive to transmitting the first message, utilizing the order routing system, match the electronic security transaction order in the first message to a second electronic security transaction order in a second message.

In some implementations, the order handling engine is configured to execute the electronic security transaction order, responsive to matching the electronic security transaction order to the second electronic security transaction order. Responsive to executing the order, the order handling engine transmits a return message to the user device.

In some aspects of the disclosure, a non-transitory computer-readable storage medium is disclosed. The non-transitory computer-readable storage medium includes instructions, which, when executed by one or more computer processors in an exchange computer system, cause the one or more computer processors to perform operations. The operations involve receiving, at a system from a user device, a first message related to an electronic security transaction order. The system has an order routing system, an order matching system, and order handling engine, and storage. The operations include determining, by the order handling engine, a first time at which the first message is received by the order routing system from the user device. The operations apply, at the first message, a time stamp indicative of the first time. An MPT, is stored in the storage, for processing any message related to the electronic security transaction order at the order routing system. The operations determine, at the order handling engine, whether a time that has elapsed from the first time satisfies the MPT. Responsive to determining that the time elapsed from the first time does not satisfy the MPT, the operations proceed by blocking transmission of the first message until the time elapsed from the first time satisfies the MPT. The operations determine, at the order handling engine, whether a second elapsed time from the first time satisfies the MPT after blocking transmission of the first message. The operations provide instructions transmit, by the order routing system, the first message to the order matching system in response to the second elapsed time satisfying the MPT.

In some implementations, the first message includes a plurality of parameters that include a type of order, and quote information for the purchase or sale of financial instrument.

In some implementations, the order handling engine is configured to determine processing speeds of each order handler in a group of order handlers, and determine a slowest processing speed among the group of order handlers.

In some implementations, the order handling engine is configured to electronically group, into one set, a group of order handlers. The order handling engine is configured to determine the MPT by comparing a processing time of each order handler within the group of order handlers.

In some implementations, responsive to transmitting the first message utilizing the order routing system, a matching engine is configured to match the electronic security transaction order in the first message to a second electronic security transaction order in a second message.

In some implementations, the order handling engine is configured to, responsive to matching the electronic security transaction order to the second electronic security transaction order, execute the electronic security transaction order. Responsive to executing the order, transmit a return message, utilizing the order handling engine, to the user device.

In some aspects of the disclosure, a method is disclosed. The method includes receiving, at an exchange computer system from a user device remote to the exchange computer system and through a computer network, a first message related to an electronic security transaction order. The computer network includes a network of interconnected electronic devices. The exchange computer system has an order handling engine, an order routing system, and storage, and the exchange computer system is configured to receive the electronic security transaction order through the computer network. The method includes determining, by the order handling engine, a first time at which the first message is received by the order routing system from the user device. The method proceeds by applying, to the first message, a time stamp indicative of the first time. The method additionally includes storing, in the storage, a MPT for processing any message related to the electronic security transaction order at the order routing system. The method includes determining, by the order handling engine, whether a time elapsed from the first time satisfies the MPT. In response to determining that the time elapsed from the first time does not satisfy the MPT, the method blocks transmission of the first message until the time elapsed from the first time satisfies the MPT. The method includes determining, by the order handling engine, whether a second elapsed time from the first time satisfies the MPT after blocking transmission of the first message. The method includes transmitting, by the order routing system, the first message to the order routing system in response to the second elapsed time satisfying the MPT.

In some implementations, the first message includes determining a type of order in the first message, and assigning a port and an order handler utilizing the determined type of order.

In some implementations, the order handling engine is configured to determine processing speeds of each order handler in a group of order handlers, and determine a slowest processing speed among the group of order handlers.

In some implementations, the slowest processing speed is utilized to determine the MPT.

In some implementations, the order handling engine is configured to electronically group, into one set, a group of order handlers. The order handling engine is configured to determine the MPT by comparing a processing time of each order handler within the group of order handlers.

In some implementations, responsive to transmitting the first message utilizing the order routing system, matching the electronic security transaction order in the first message to a second electronic security transaction order in a second message.

In some implementations, the order handling engine is configured to, responsive to matching the electronic security transaction order to the second electronic security transaction order, execute the electronic security transaction order. Responsive to executing the order, transmit a return message, utilizing the order handling engine, to the user device.

In another aspect of the disclosure, a method for conducting trades in an exchange computer system is described. The method includes receiving, by the exchange computer system from a user device remote to the exchange computer system and through a computer network, a first message and a second message. The first message and second message are related to one or more electronic security transaction orders, and the computer network includes a network of interconnected electronic devices. The exchange computer system includes a trade engine processor, an order routing system, a matching engine, and storage. The exchange computer system is configured to receive the electronic security transaction order through the computer network. The method includes determining, by the trade engine processor, a first time at which the first message is received by the order routing system from the user device. The method further includes applying, to the first message, a first time stamp indicative of the first time. The method proceeds by applying, to the second message, a second time stamp indicative of the second time, wherein the first message includes a greater amount of data than the second message. Additionally, the method includes storing, in the storage, a minimum processing time for processing any message related to an electronic security transaction order at the order routing system. The method includes determining, by the trade engine processor, whether a time elapsed from the first time satisfies the MPT. In response to determining that the time elapsed from the first time does not satisfy the MPT, the method proceeds by blocking transmission of the first message until the time elapsed from the first time satisfies the MPT. In response to determining that the time elapsed from the second time does not satisfy the MPT, the method includes blocking transmission of the second message until the time elapsed from the second time satisfies the MPT. The method continues by determining, by the trade engine processor, that a third elapsed time from the first time satisfies the MPT after blocking transmission of the first message. The method further includes determining, by the trade engine processor, that a fourth elapsed time from the second time satisfies the MPT after blocking transmission of the first message. The method proceeds by transmitting, by the order routing system, the first message to the matching engine in response to the third elapsed time satisfying the MPT. The method continues by transmitting, by the order routing system, the second message to the matching engine in response to the fourth elapsed time satisfying the MPT.

Certain implementations may provide various advantages. For example, the disclosed technology can be used to enhance the speed and efficiency with which an exchange computer system processes high volumes of orders.

The details of one or more embodiments of the subject matter described in this specification are set forth in the accompanying drawings and the description below. Other potential aspects, features, and advantages will be apparent from the description, the drawings, and the claims.

BRIEF DESCRIPTION OF THE DRAWINGS

FIGS. 4A-B are flowcharts of examples of implementing minimum processing time on the exchange computer system of FIGS. 1-2.

DETAILED DESCRIPTION

This disclosure relates to an exchange computer system configured to enable users or market participants to equitably submit orders on the exchange computer system by implementing a minimum processing time for received orders. The implementations described herein also reduce the consumption of network resources and bandwidth utilization particularly on days when market volatility is high, thereby allowing exchange systems to operate more smoothly and reduce panic among market participants.

For example, by implementing the minimum processing time described herein, the exchange computer system reduces the disparity of order handler processing times and reduces the potential resulting "reordering" of messages. For example, an order handler A that receives more order or message activity can process order messages faster than an order handler B that does not receive as much order or message activity. Accordingly, this disparity may encourage some market participants to engage in "warming" activity, where orders or messages are more frequently sent to the exchange system, so that received orders are more likely to be processed on order handler A, as opposed to order handler B.

Because of the disparity in order handling, a first order or message might be received at order handler B before a second order or message is received at order handler A, but the second order or message might be processed before the messages at order handler B, because order handler A processes messages more quickly. The disparity in order handling may cause faster order handlers, such as order handler A, to send messages to a matching engine ahead of other messages that happened to be processed by the slower order handlers, e.g., order handler B.

Processing times in a given order handler can vary for a number of reasons including warmness of cache memory. Processing time disparity can result from the nature of software and hardware interactions, which are not resolvable with new hardware or hardware configurations. Implementing Minimum Processing Time (MPT) on the exchange computer system enables more equity in order handling as the MPT establishes a minimum amount of time a given order or message spends in a given process layer of the exchange computer system. Because MPT sets a minimum time or floor for handling orders and messages, MPT limits the ability of market participants to externally influence the speed at which orders are sent to the matching engine by using warming behaviors or other strategies.

Figure 1:
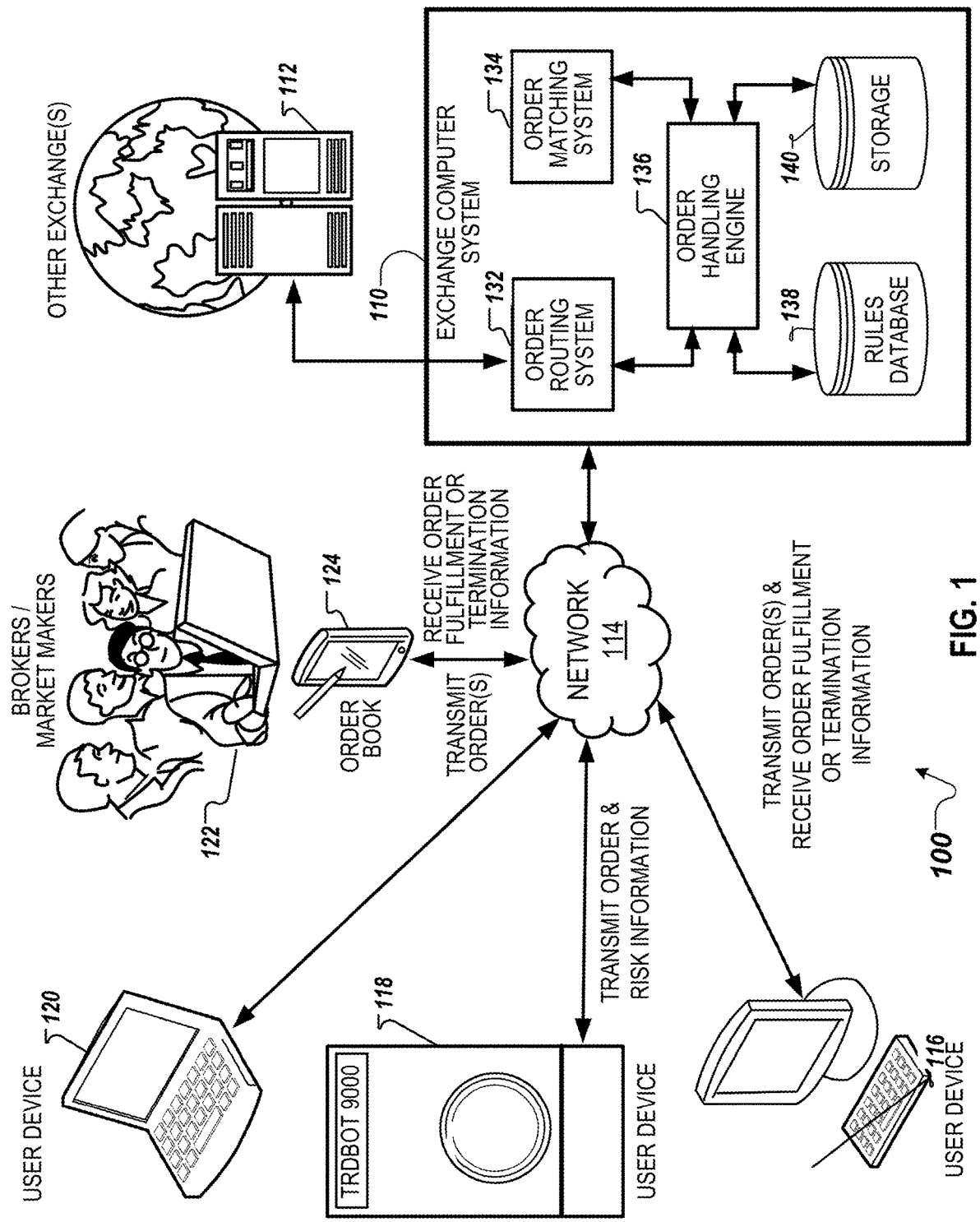
FIG. 1 is a diagram of an example of an environment having an exchange computer system and associated networks, devices, and users.

FIG. 1 is an example diagram of an environment 100 having an exchange computer system 110 configured to enable trading orders utilizing MPT, and the associated networks, devices, and users that make up an exemplary trading environment in which that system operates. Generally, the term "user" may refer to any entity that interacts with the exchange computer system and/or associated networks and devices. Users may include, for example, market makers and other market professionals, brokers, institutional traders, individual traders, and automated trading systems. The diagram includes an exchange computer system 110, other exchanges 112, a network 114, user devices 116, 118, 120, market makers/brokers 122, and an electronic order book 124. The exemplary methodologies claimed below may, for example, run on exchange computer system 110.

The exchange computer system 110 may be implemented in a fully electronic manner, or in a hybrid manner that combines electronic trading with aspects of traditional open-outcry systems. The exchange computer system 110 may receive orders for trading financial instruments locally on the floor and from remote electronic devices. The financial instruments may include securities such as stocks, options, futures contracts, or other derivatives associated with an underlying asset. The exchange computer system 110 may be implemented by software, hardware, or some combination as described herein. As an example, the exchange computer system 110 may be implemented as a server, a computer, or other device or processing component using proprietary software designed and implemented to achieve the functionality described herein. The exchange computer system 110 may be distributed or subdivided between a plurality of entities e.g., multiple computing devices.

Network 114 connects the various components within the trading environment, and may be configured to facilitate communications between those components. The network 114 may, for example, be configured to enable the exchange of electronic communications that include order and order fulfillment information between connected devices, such as an electronic order book 124 and the exchange computer system 110.

The network 114 may include one or more networks or subnetworks, each of which may include a wired or wireless data pathway. Network 114 may, for example, include one or more of the Internet, Wide Area Networks (WANs), Local Area Networks (LANs), or other packet-switched or circuit-switched data networks that are capable of carrying electronic communications (e.g., data or voice communications). To protect communications between the various systems, devices, and components connected to network 114, the network 114 can implement security protocols and measures such that data identifying order or bid information, or parties placing orders or quotes, can be securely transmitted. Network 114 may, for example, include virtual private networks (VPNs) or other networks that enable secure connections to be established with exchange computer system 110.

User devices 116, 118, and 120 may include portable or stationary electronic devices, such as smartphones, laptops, desktops, and servers that include user interfaces to display information and receive user input, and that are configured to communicate over a computer network, such as the network 114. User devices 116, 118, and 120 may communicate with the exchange computer system 110 over network 114 using a proprietary protocol, or a message-based protocol such as financial information exchange (FIX), implemented over TCP/IP. User devices 116, 118, and 120 may transmit user input such as order information or risk information to the exchange computer system 110, and may also receive data from the exchange computer system 110 indicating that an order has been filled or canceled. Users such as brokers/market makers 122 may also place orders and receive information about order fulfillment or termination through electronic order book 124, which may include a record of outstanding public customer limit orders that can be matched against future incoming orders.

The exchange computer system 110 includes an order routing system (ORS) 132, an order matching system (OMS) 134, an order handling engine 136, a database of trading rules and algorithms in a rules database 138, and storage 140. In some implementations, the exchange computer system 110 is a distributed computer system. The order routing system (ORS) 132 determines whether a received order or quote is to be executed at the exchange computer system 110, or should instead be redirected to another exchange 112 external to the exchange computer system 110. The ORS 132 can include processing systems that enable the management of high data volumes. For example, the ORS 132 can receive order or quote information for the purchase or sale of financial instruments from one or more user devices 116, 118, 120, and 124. In some implementations, the ORS 132 can also be connected to or include a touch-screen order routing and execution system accessible by brokers on the exchange floor, such as a public automated routing (PAR) system.

Upon receiving an order or quote, the ORS 132 determines whether the destination specified in the received order or quote is the exchange computer system 110. If the exchange computer system 110 is not the destination, the ORS 132 forwards the order or quote to another exchange 112, which can be either the destination exchange, or an exchange en route to the destination exchange. If the ORS 132 determines that the exchange computer system 110 is the destination of the received order or quote, the ORS 132 can forward the received order or quote to the OMS 134.

The order handling engine 136 may also access other components of the exchange computer system 110 including the OMS 134, ORS 132, rules database 138, and storage 140. The ORS 132 may be configured to route the order received from the user device to a destination associated with the order. The storage 140 may include additional data from the exchange computer system 110, accessed by the order handling engine 136 for processing.

The order matching system (OMS) 134 can include processing systems that analyze and manipulate orders according to matching rules stored in the database 138. The OMS 134 can be implemented with one or more order matching engines (see FIG. 2, matching engine 216), and each matching engine can control the book for one or more classes of options listed for trading on the exchange computer system 110. In some implementations, the OMS 134 includes an electronic book (EBOOK) of orders and quotes with which incoming orders to buy or sell are matched, according to the matching rules. The EBOOK can also be implemented in a separate database such as storage 140, which can include multiple mass storage memory devices for the storage of order and quote information. When the OMS 134 determines that a match exists for an order (for example, when a bid matches an offer for sale), the OMS 134 can mark the matched order or quote with a broker-specific identifier so that the broker sending the order or quote information can be identified.

The exchange computer system 110 can be implemented with a plurality of order handlers. For example, the ORS 132 can be implemented with a plurality of order handlers. In some implementations, the order handling engine 136 sends and receives data corresponding to MPT from a single order handler. In other implementations, the order handling engine 136 sends and receives data corresponding to MPT from a plurality of order handlers. The order handling engine 136 utilizes one or more algorithms to determine, at random, which order entry port(s) should connect to a given order handler. For example, in some implementations of MPT, the algorithm spreads out the selection of order entry ports across order handlers for a single market participant having multiple orders. As such, the algorithm implemented by the order handling engine 136 balances the number of order entry ports that connect to a given order handler 218 (see also, order handlers 510-520, FIG. 5). The algorithm spreads out a given market participants' access to ports on the exchange computer system across order handlers, and balances the number of ports that connect to a single order handler.

The order handling engine 136 processes the messages received from the order entry port. Processing messages includes determining whether each message includes information to enter the exchange computer system and where to route that message within the exchange computer. For example, if a received order belongs to a particular class of orders, the order handling engine 136 can route the order to an order handler and/or logical port assigned to the particular class of orders. The order handling engine 136 can also determine which order matching engine of the OMS 134 a given message should be routed. For example, a given message can include information that on a particular type of order. This information is extracted from the given message and is routed accordingly. For bulk messages, the information can include data related to a class of order or instruments and may designate a routing location based on the class. When the class information is extracted from the message, the information is used to route the message to the appropriate order handler or matching engine.

In some implementations, the order handling engine 136 can be implemented using software, hardware, or a combination of both software and hardware. The order handling engine 136 can, for example, be implemented as one or more hardware processors configured to execute one or more algorithms, as described in further detail below. An example configuration of an exchange computer system featuring the order handling engine 136 is more fully described below in FIG. 2. In some implementations, kernel bypass and spinning are enabled on the exchange computer system, enabling a reduction in latency. Accordingly, in some implementations, each order or message implementing using MPT can have a dedicated CPU core. In some implementations, more than one order handling engine can be used at a given time and can be implemented to process orders based on different criterion, e.g., by class of orders, by type of underlying instrument, a combination of both, or other suitable criteria. In some implementations in which multiple order handling engines are implementing MPT, each order or message can be implemented on a dedicated CPU core.

The matching engine can be configured to perform various operations including to receive a message, apply risk controls, execute instructions included in the message, route the message within the exchange computer system 110, execute an order within the message, or store order information in an order book. Once the order handler processes the message utilizing MPT, the message is routed to the appropriate matching engine of the OMS 134. The matching engine of the OMS 134 provides a time stamp to messages in the order in which the messages are received. The matching engine is configured to match an order in the received message to another order in a different received message, e.g., matching a buy order with a sell order. In response to matching the orders, the exchange computer system 110 transmits a return message to the user device(s) involved in the transaction and can update the order book.

While each order handler can have substantially the same hardware and software configuration, at times there are unintended differences between the amount of time it takes each order handler to process a message (e.g., a message including an order or a bulk message including a bulk order). As such, the amount of message traffic can impact these processing times at the exchange computer system.

For example, the order handler can process messages faster when the message is sent from the user device, at a faster rate, to the exchange computer system 110. As explained below, a given order handler may take between about 4 us and about 40 us to process a given messages. For example, it can take between about 4 us and about 12 us to process a bulk message. Additionally, it can take between about 27 us and about 40 us to process an order that is not a bulk message. The unintended differentiation in processing times can cause a "reordering" of messages, as explained above. For example, suppose user A submits Bulk Message 1 in class XYZ, which goes into Order Handler M and is processed in 6 us and then routed to the class XYZ matching engine. One microsecond (1 μs) later, user B submits Bulk Message 2 in class XYZ, which goes into Order Handler N and is processed in 4 μs and then routed to the class XYZ matching engine. Despite being submitted to the exchange computer system 110 second, Bulk Message 2 will be reached and processed at the matching engine before Bulk Message 1.

When the MPT is activated on the exchange computer system 110, an inbound order or message is not forwarded to the matching engine of the OMS 134 until the MPT for holding the order within the order handling engine 136 is satisfied. In some implementations, the MPT is no greater than a threshold amount of time, e.g., 20 μs. For example, the threshold amount of time may correspond to the slowest processing time when the order handler is not implementing a hold time. For example, Binary Order Entry (BOE) Order processing times may vary from about 27 μs to about 40 μs, and processing times for BOE Quotes (US Options) may vary from about 4 μs to about 12 μs. As such, in some implementations, the threshold amount of time to implement MPT can be between about 4 μs to about 40 μs, such as between 4 μs and 12 μs, or about 4 μs to about 30 μs, or about 10 μs to about 40 μs, and the like. Because order messages and bulk order massages include different types of information, the exchange computer system may determine separate MPTs for order messages and bulk messages. In some implementations, the order handling engine 136 may not apply a hold time. For example, when the order handling engine 136 has a processing speed that is greater than the MPT, a hold time will not be applied because the given order handler's processing time exceeds the MPT.

For example, when a message (e.g., order message or bulk order message) arrives at the order handling engine 136, the message is assigned a time stamp. The clock provides a time stamp to the message, which can be appended as data, or embedded in metadata of the message. The time stamp can be implemented as a sequence of characters or encoded information that identifies when the message is received. The time stamp, in some implementations, is formatted with data indicating a year, a month, day, and time. Time can be formatted in hours, minutes, seconds, and fractions of a second, such as microseconds (μs).

The message is not sent to the matching engine until the MPT has lapsed. For example, the order handling engine 136 may determine that the MPT is 6 μs. If an order handler is fully optimized (i.e., warm), without implementing MPT, the message could possibly be sent to the OMS 134 at 4 μs. However, by implementing MPT, e.g., by implementing a delay buffer to hold an order for a certain time period, the message is processed after the order handling engine 136 adds a hold time, e.g., 2 μs, to satisfy the MPT and then forwards the message to the OMS 134. The delay buffer (not shown) can be implemented to locally store the message, which includes an order, in the order handling engine 136 until the MPT expires. In some implementations, the delay buffer can receive a signal from the order handler indicating when to release an order. Alternatively, the delay buffer may include one or more counters that are set to a value that satisfies the MPT for a particular order. When the counter counts down to zero, an order can be released from the delay buffer.

The order handling engine 136 can determine a MPT based on information received from one or more networked user devices. The order handling engine 136 may generate the MPT by following processes further described, for example, with respect to FIGS. 3-5. After generating orders utilizing MPT, the order handling engine 136 may notify other exchanges (e.g., exchanges 112) and one or more user devices (e.g., user devices 116, 118, 120) of generation of the orders using MPT over the network 114. As noted above, the generation and trading orders utilizing MPT, reduces disparity in the processing times at which order handlers process received messages.

When implemented, the order handler can implement MPT such that any message, e.g., order messages and bulk messages, can be processed within a MPT (e.g., a predetermined time period). The order handling engine 136 can add a hold time. Accordingly, the message is held within the order handler until the MPT is met. The MPT may refer to the processing time of the order handler plus the hold time.

In some implementations, the exchange computer system 110 may not hold an order or bulk message that is processed by an order handler for a length of time greater than the MPT. As such, if an order handler processes a message in a given amount of time (i.e., without applying the MPT) that is longer than the hold time, the order handling engine 136 will not apply the hold time to the order handler. The order handling engine 136 can be configured to apply a hold time that will improve the likelihood of equitable message processing, based on current message activity levels and processing times for the order handlers. In some implementations, the order handling engine 136 can adjust the MPT, in response to an increase or decrease in message level activity. For example, when there is low message level activity, the order handling engine 136 may increase the use of MPT, as MPT is applied to order handlers that are more frequently used, so that the overall processing time is more equal to order handlers that are less frequently used.

For example, in some implementations, the exchange computer system may activate the order handler processing hold times for bulk messages, with a hold time of 6 μs. If an order handler processes a bulk message in 4 μs that order handler will hold the bulk message for an additional 2 μs before releasing the bulk message to the applicable matching engine. In another implementation, if an order handler processes a bulk message in 5 μs, that order handler will hold the bulk message for an additional 1 μs before releasing it to the applicable matching engine. Any bulk message processed by an order handler in 6 μs, or more, will be released to the applicable matching engine as soon as message processing is complete. Any additional hold time can be applied by the exchange computer system to the bulk message.

In some implementations, the MPT can be no greater than the slowest processing time for a plurality of order handlers within a given period. For example, the exchange computer system 110 can determine the slowest processing time for a group of order handlers. For example, if the slowest order handler process of the group processes messages at 15 μs and the fastest order handler in the group processes message at 10 μs, the order handling engine 136 may set the MPT at 15 μs. Accordingly, the hold time for the fastest order handler is 5 μs. However, for one or more other order handlers, the hold time can be different. For example, for an order handler that processes message at 11 μs, the hold time for that order handler is 4 μs. The number order handlers can be a positive number between 1 and k, where k is an integer that does not exceed the number of order handlers in the exchange computer system 110.

In some implementations, when applying MPT, a network interface (NIC) clock and a computer or server clock, should be synchronized. The NIC clock communicatively couples the network 114 and the exchange computer system 110. In some implementations, the NIC clock synchronizes with a clock of the order handling engine 136. Current messages that arrive on the NIC, while prior messages are being processed, can still receive a time stamp from the NIC of the order handling engine 136. In this manner, the prior message(s) can be processed and MPT can be applied to the prior message, which in return can shorten the wait time for next message that can be waiting in the NIC before being processed. The NIC can be implemented as part of the order handling engine 136, or can be implemented external to the order handling engine 136.

MPT enables variations in processing time to be minimized or substantially eliminated. Even large MPT values will not limit the throughput for messages flowing towards the matching engine (e.g., matching engine 216, FIG. 2), because messages get credit for time spent waiting in the NIC. In some implementations, MPT can be performed on a separate processor core. Advantageously, performing MPT on a separate core would minimize return traffic throughput limits that are associated with high MPT values.

Bulk messages can be processed faster than order messages because bulk messages generally include fewer instructions than message orders, which are individually processed by the exchange computer system. For example, the bulk message can include a single electronic message that may include instructions to enter, modify, or cancel up to a specified number of bids and offers. The order handling engine 136 can apply different hold times to bulk messages and order messages. Additionally, due to the differences between order messages and bulk messages, the exchange computer system permits the disclosed hold time for either orders or bulk messages, depending on observed processing times and activity levels for each order handler.

For example, as a component of exchange computer system 110, order handling engine 136 is well suited to the role of a centralized and authoritative creator of orders utilizing MPT, at least insofar as it is able to efficiently generate the MPT using data to which exchange computer system 110 already has access. In contrast, and absent the service provided by order handling engine 136, other systems (e.g., user devices 116, 118, and 120) would need to redundantly devote significant bandwidth to monitoring this data.

The exchange computer system 110 may be configured to receive data from one or more user devices (e.g., user devices 116, 118, and 120) by the network 114 connected to the exchange computer system 110. The received data describes a request to enter the message including an order within the electronic order book 124. The exchange computer system 110 facilitates the transaction by determining a second order in the electronic order book 124 matches the order described in the received data. The exchange computer system 110 may utilize the ORS 132 to route the order from the received data and the OMS 134 to match the second order in the electronic order book 124 to the order.

The exchange computer system 110 may also be configured to simultaneously receive (e.g., by the network 114 and ORS 132 of the exchange computer system 110) from one or more user devices, multiple messages for orders. The exchange computer system 110 receives a third order while the second order in the electronic order book 124 matches the order from the received data.

The electronic order book 124 may be a trade at settlement order book and the determined transaction price of the order from the received data is based on a daily settlement price of the orders or bulk orders. In some implementations, the electronic order book 124 may be a mark-to-model order book and the determined transaction price of the order from the received data is based on a daily settlement price determined by one or more financial models. For example, the daily settlement price may be provided by a financial model when a market for the underlying asset is not available, e.g., for complex financial instruments. In some implementations, the daily settlement price may be determined from a non-total return forward curve with a known expected dividend return.

In some implementations, the exchange computer system 110 can be a distributed computer system that includes an order entry port, an order routing system (e.g., ORS 132), an order matching system (e.g., OMS 134), and the order handling engine (e.g., order handling engine 136). The distributed computer system can operate multiple hardware and software processes in parallel configurations. The order entry port can receive the order from the data sent to the exchange computer system by a user device and the order routing system is configured to route the order to a destination associated with the order. As an example, the destination can include other exchanges 112, based on matching rules stored on database 138 and the configuration of the order matching system to match the order to the destination in the other exchanges 112.

In some implementations, an order entry port can be a physical port that provides a physical connection to the exchange computer system and may provide access to multiple logical ports. A logical port can be implemented by software and enables a receiving device, e.g., the ORS 132, OMS 138, order handler 218 or matching engine 216, to identify which application or service the message is destined for. Logical ports can provide users with the ability to accomplish a specific function through a connection, such as order entry, data receipt, or access to information. In some implementation, the order entry port is a bulk port, which can be dedicated logical port that provides users with the ability to submit bulk messages (subject to certain restrictions), as well as orders. A bulk message is a bid or offer included in a single electronic message that a user submits with an M (market-maker) capacity to the exchange computer system enabling the user to enter, modify, or cancel a number of bids and offers. Bulk messages may be processed faster than orders, because bulk messages may include fewer instructions that need to be read by the exchange computer system than orders. In some implementations, the order handlers, physical ports, and/or logical ports are assigned according to the type of order received, e.g., bulk message or simple message.

As noted above, processing times for different message types can vary. This flexibility permits the exchange computer system to apply the hold time to each message type as appropriate, based on message activity and processing times observed. Additionally, at a given period of time, bulk message (e.g., quoting) activity may represent a significant majority of message activity on the exchange computer system. Because bulk messages are processed faster than order, the exchange computer system applies the hold time to bulk messages according to the increased level of activity and lower processing times. Unintentional delays, such as delays due to geography, can add milliseconds to the time it takes messages to reach a match engine, which generally are de minimis delays.

Storage 140 and database 138 store and handle data in a manner that satisfies the privacy and security requirements of the exchange computer system 110 and its users, and may store one or more of telemetric data, user profiles, user history, and rules and algorithms for matching quotes, bids, and orders.

Upon completion of a trade (through the floor in open outcry as entered into the PAR system, or through automatic execution through the OMS 134 and order handling engine 136), the fill information is passed through the OMS 134 and the ORS 132 to one or more user devices 116, 118, 120, and 124, and to the order handling engine 136. The order handling engine 136 matches the buy side and sell side of a trade, and forwards the matched trade to a third party organization that verifies the proper clearance of the trade, such as the Options Clearing Corporation (OCC) where the securities may be options, or Depository Trust Company (DTC) where the securities may be equities. The OMS 134 also formats the quote and sale update information and sends that information through an internal distribution system that refreshes display screens on the floor, in addition to submitting the information to a quote and trade dissemination service such as, in the case of options, the Options Price Reporting Authority (OPRA). In the case of Equities, the information would be submitted to the Securities Information Processor (SIP).

Figure 2:
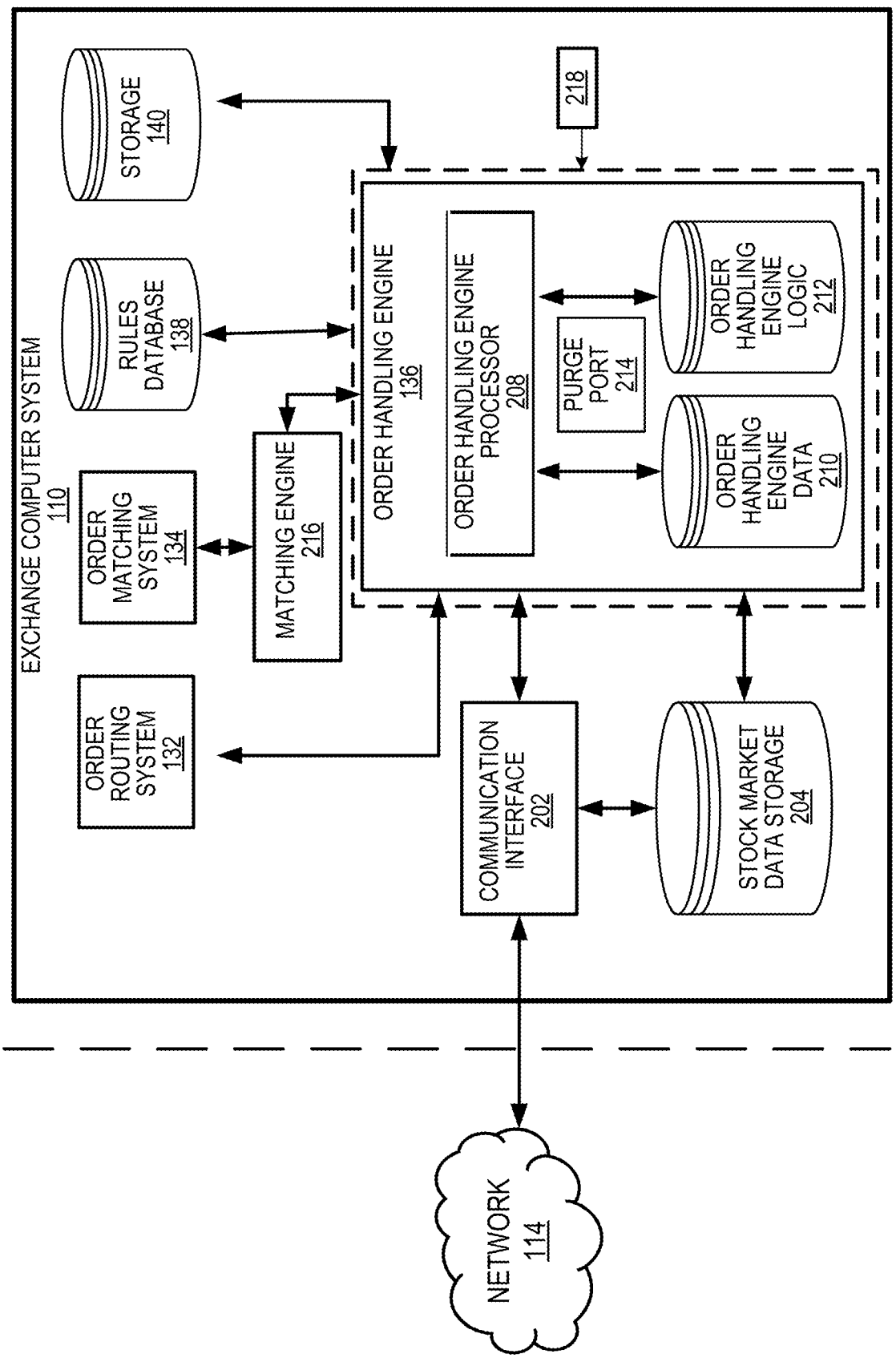
FIG. 2 is a diagram of an example exchange computer system 110 configured to execute orders by implementing a minimum processing time.

FIG. 2 is a diagram illustrating details of order handling engine 136, configured for generating messages utilizing MPT, as described herein. The exchange computer system 110 may include a communication interface 202, coupled with a market data storage 204, such as stock market data storage. The communication interface 202 may be communicatively linked to the order handling engine 136, which includes an order handling engine 208, order handling engine data 210, and order handling engine logic 212. The order handling engine 136 may also be communicatively linked to the OMS 134, the ORS 132, the rules database 138, and storage 140 of the exchange computer system 110. The communication links in the exchange computer system 110 may be established by a system bus, network, or one or more other connection mechanisms. As an example, the connection mechanisms may include a wired connection, a wireless connection, or a combination thereof. For example, the connection may be a physical connection, such as a wired Ethernet connection. In another example, the connection may be a wireless connection, such as a cellular telephone network, an 802.11, 802.16, 802.20 controls or components, a WiMax network, or any other type of network. Further, network 114 may be a public network, such as the Internet, a private network, such as an intranet, or combinations thereof, and may utilize a variety of networking protocols now available or later developed including, but not limited to TCP/IP based networking protocols.

The matching engine 216 receives messages from the order handling engine 136, and matches security transaction orders in the message to other security transaction orders in subsequently received or previously received messages. While shown separately, the matching engine 216 can be implemented partially or wholly within the OMS 134. The OMS 134 can be implemented with a plurality of matching engine 216. Once a message is received at the matching engine 216, the matching engine 216 may apply appropriate risk controls, determine marketability of the message, apply any instructions included on the message, execute the message, store the message in the electronic book, or route the message to another exchange system.

An order handler 218 includes the order handling engine 136, order handling engine 208, order handling engine data 210, order handling engine data 210 and/or order handling engine logic 212. In some implementations, the order handler 218 includes a purge port 214. The order handling engine 208 may include one or more processors, such as general-purpose processors (e.g., a microprocessor), special-purpose processors (e.g., an application-specific integrated circuit (ASIC) or digital-signal processor (DSP), programmable-logic devices (e.g., a field programmable gate array (FPGA)), or any other processor components now known or later developed. The order handling engine 208 may include an internal clock configured to generate data indicating a current time and date, including day, month, and year. As explained below, the clock data may be used to determine MPT for the order handling engine 136. The order handling engine 208 may carry out one or more instructions using one or more arithmetic, logical, and/or input/output operations. Though order handling engine 208 is illustrated as a single component, order handling engine 208 may be integrated in whole or in part with other components of the exchange computer system 110. The order handling engine 208 can include a timer, in some implementations. In another implementation, the timer can be implemented in other hardware or software components in the exchange computer system 110. In some implementations, the order handling engine 208 is separately implemented from the order handler 218, but is electrically coupled to the order handling engine 208.

Data storage e.g., market data storage 204 and order handling engine data 210, may be a main memory, a static memory, or a dynamic memory. Market data storage 204 and storage for order handling engine data 210 may include, but may not be limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media, organic storage components, and the like. As an example, the market data storage 204 and storage for order handling engine data 210 may include a cache or random access memory for the order handling engine 208. Market data storage 204 and storage for order handling engine data 210 may be separate from the order handling engine 208, such as a cache memory of a processor, the system memory, or other memory. Market data storage 204 and storage for order handling engine data 210 may be an external storage device or database for storing data. Examples may include a hard drive, compact disc ("CD"), digital video disc ("DVD"), memory card, memory stick, universal serial bus ("USB") memory device, or any other device operative to store data.

As further shown, the order handling engine 136 may include order handling engine data 210 and/or order handling engine logic 212. The order handling engine data 210 may include one or more types of data suitable for a given implementation. For example, order handling engine data 210 may include data (such as input datasets) that may be stored in memory. Order handling engine logic 212 may include, for example, machine language instructions executable by order handling engine 136 to perform various functions, such as the functionality of the methods and systems described herein. In some implementations, the functions, acts or tasks may be independent of the particular type of instructions sets, storage media, processor or processing strategy and may be performed by software, hardware, integrated circuits, firm-ware, micro-code and the like, operating alone or in combination. Processing strategies may include multiprocessing, multitasking, parallel processing and the like.

In the exchange computer system 110, the communication interface 202 may include one or more structures, and associated equipment, for receiving data from one or more sources and distributing data to a group of one or more destinations. In some implementations, the communication interface 202 may include one or more additional communication interfaces and can operate in different configurations (e.g., distributed system, parallel). The communication interface 202 may be configured to receive input datasets from one or more entities (e.g., user devices or other exchanges) and store all or part of the input datasets in market data storage 204. The communication interface 202 may also be configured to communicate all or part of the input datasets to the order handling engine 136 once the input datasets are stored or otherwise processed. The communication interface 202 may include a transceiver having one or more input/output ports connected to the network 114 to securely transmit data for messages related to orders, such as orders or bulk orders, from the order handling engine 136 to user computing devices, as shown in FIG. 1.

As an example, the input datasets are stored in market data storage 204 may be partitioned (e.g., horizontal, vertical, functional) into designated memory locations (e.g., virtual addresses) based on qualities of the input datasets, e.g., a type of message or order, and a type of underlying asset. In some implementations, input datasets with data related to component stock options may be stored in market data storage 204 and include a linking identifier (e.g., address, memory mapping) to identify a corresponding stock for each of the component stock options. In some implementations, the market data storage 204 may be configured to receive an indicator describing the operating status (e.g., receiving, clearing, storing) of input datasets of the communication interface 202.

The input datasets from the communication interface 202 may include financial market data (e.g., market intelligence) corresponding to the messages for orders. For example, financial market data may include volatilities, interest rates, dividends, returns (e.g., historical, expected), market capitalization, sector, prices, liquidity, and other metrics related to the underlying asset and the message or order. Financial market data may also include measures, estimates, and other related data for options (e.g., calls, puts), futures, and other derivatives for orders. The input datasets may also include corresponding log files to describe and store the financial market data e.g., a log file describing messages or orders related to messages, such as messages for orders or bulk orders. The log files may include metadata to tag or characterize data, e.g., corresponding time periods for which the data was recorded. For example, the log files may include a tag to be used for sorting or filtering the data of the log files.

Upon receiving input datasets from the communication interface 202, including data stored in the market data storage 204, the order handling engine 136 may perform further processes including receiving requests and accessing metadata. The order handling engine 136 may perform operations using the order handling engine 208, with instructions stored in the order handling engine logic 212, and data stored in order handling engine data 210. The data stored in order handling engine data 210 may include all of or a subset (e.g., filtered) of the data stored in market data storage 204, where the subset of the data stored in the order handling engine data 210 is filtered based on a specified time period. The order handling engine 136 may perform operations on the order handling engine data 210 including deleting, archiving, tagging, and resetting. The order handling engine 136 can utilize metadata, including log files, to process (e.g., filtering, sorting) the order handling engine data 210.

In some implementations, the order handling engine 136 can be configured with one or more purge ports 214. The one or more purge ports 214, which may be used to cancel one or more sets of orders. In general, a purge port may refer to a dedicated port that permits a user to simultaneously cancel all or a subset of its orders in one or more symbols across multiple logical ports by requesting the exchange computer system 110 to effect such cancellation. In some implementations, order handling engine 136 may determine that a given order (e.g., an order for an IEO or non-IEO) is associated with a given purge port. The order handling engine 136 may send an instruction to the given purge port to cancel all orders associated the given order. Alternatively, the order handling engine 136 may bypass the given purge by executing operations to cancel the given order, without sending an instruction to the given purge port. The one or more purge ports 214 can be implemented as hardware, software, or a combination of both and is configured to receive and transmit data to and from the order handling engine 136 and/or storage. Accordingly, data indicative of the one or more sets of orders may also be deleted from storage 140.

As noted above, the exchange computer system 110 can securely transmit information related to messages or orders utilizing MPT based on data received over successive periods of time to connected user computing devices (e.g., user devices 116, 118, 120) that are themselves configured to display the information. For example, the information may be displayed within a graphical user interface of an application that facilitates continuous real-time generation, trading, and settlement of orders utilizing MPT through the exchange computer system 110. Advantageously, implementing MPT reduces the disparity of order handler processing times and reduces disparities in processing times and the potential reordering of messages, as noted above.

Figure 3:
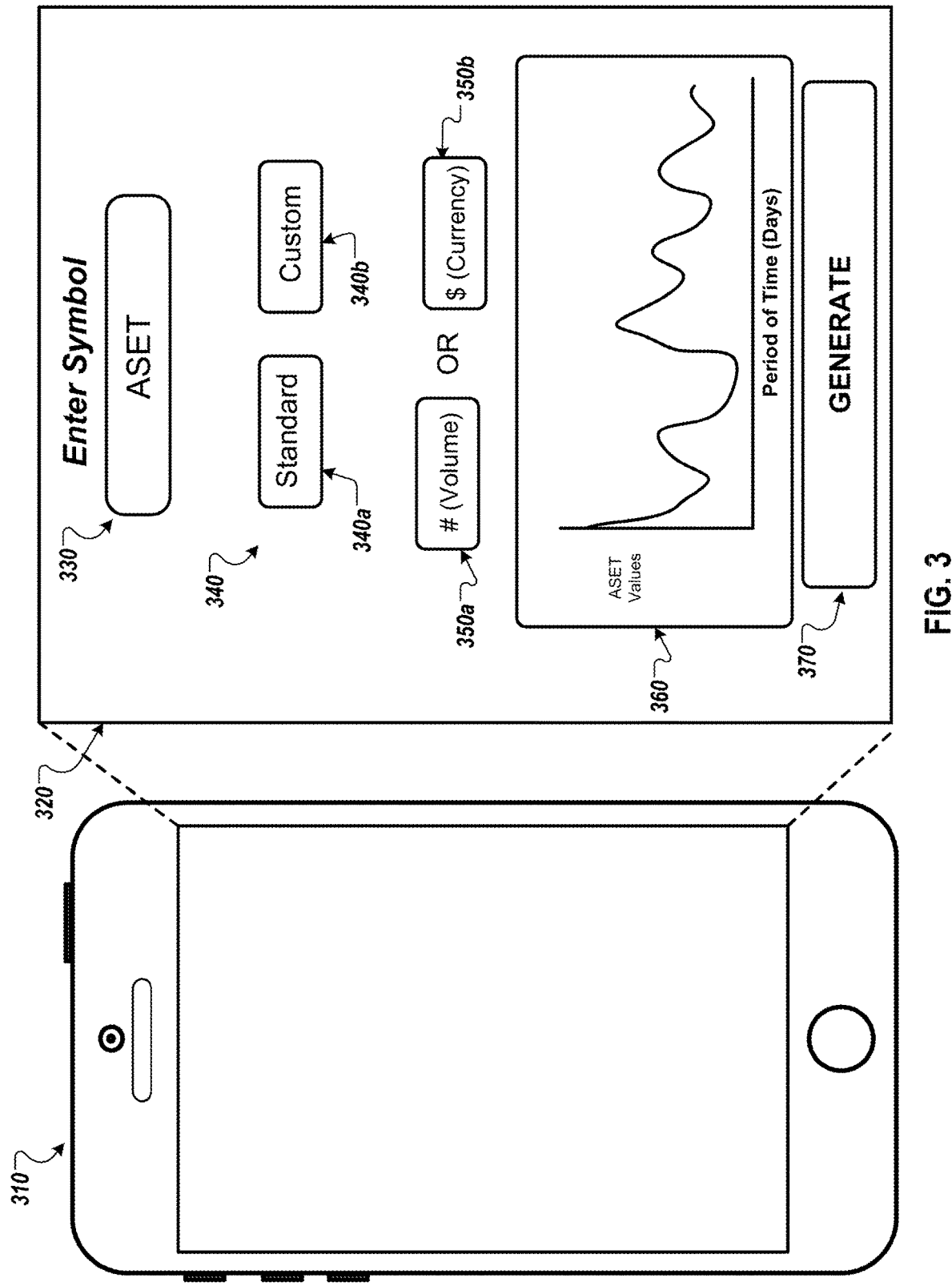
FIG. 3 is an illustration of a graphical user interface (GUI) on a user device for displaying market data, the GUI coupled to the exchange computer system of FIGS. 1-2.

FIG. 3 is an illustration of a graphical user interface on a user device 310 for displaying market data, submitting one or more orders utilizing MPT, as described herein. The user device 310 is one example of the user devices 116, 118, and 120, illustrated in FIG. 1. The manner in which a user interface panel 320 of the user device 310 displays information may vary depending on one or more parameters. For example, the computational resources of the user devices connected via network 114 to the exchange computer system 110 can vary greatly, and the user interface panel 320 may be adapted for display on each particular user device based on parameters associated with that device (including screen size, display resolution, processing speed, and available bandwidth). For instance, a user operating a PC may benefit from display of a larger amount of information, whereas a user interacting with the exchange via a smart phone might benefit from a more streamlined presentation of information. As another example, where bandwidth or processing resources are limited, a user interface panel 320 can be configured to display information in less resource-intensive ways (e.g., through simplified graphics and text).

FIG. 3 is an illustration of an exemplary graphical user interface on a user device 310 for obtaining user inputs that determine messages having data related to orders or bulk orders on the exchange computer systems of FIGS. 1-2. A client device (e.g., user devices 116, 118, and 120) can, for example, display the graphical user interface after receiving a user input indicating interest in placing an order. A user of a user device 310 can interact with the user interface panel 320 created by the user device 310 after receiving data (e.g., messages including orders and bulk orders) from the exchange computer system by a computer network (e.g., network 114). The user interface panel 320 can include fields that enable a user to enter a symbol (e.g., a stock or option symbol), select the type of the trade and specify an amount. As an example, the user can enter a symbol (e.g., "ASET") corresponding to an underlying asset through the user device 310. Utilizing the network 114, the user device 310 sends and receives messages, related to orders and bulk orders, to the exchange computer system 110.

The user interface panel 320 can include fields that enable a user to enter a symbol (e.g., a stock symbol) for an underlying asset corresponding to an order or bulk order. The user interface panel 320 can also include fields that enable a user to select a quantity of an order or bulk order, a direction of movement of the value of the asset, an expiry, and a frequency, e.g., a number of reset periods, a fixed reset period to determine the number of reset periods. For example, the user of the user device 310 can specify a symbol in an input field 330 and a number of a given asset or option to be traded utilizing a plurality of fields 340. The user of user device 310 can also specify a standard option 340a or custom option 340b, e.g., a standard or customized option.

After the user has entered necessary data and selected generate button 370, data related to the messages for orders and bulk orders provided to the exchange computer system 110. The exchange computer system 110 can, for example, generate a message related to an order based on a value of the underlying financial asset, a direction of change of value of the underlying financial asset, and a frequency or number of reset periods for options.

The user interface panel 320 may receive a series of data related to financial instrument values over successive periods of time, and the manner in which the user interface panel 320 displays these values and/or related data may be customizable based on user preferences or other parameters. As an example, the information displayed in user interface panel 320 may be customized to include both numerical and/or graphical representations of past, present, and/or projected values of orders and/or underlying assets. The user interface panel 320 may additionally be customized to display information regarding present, past, and/or projected activities based on values (e.g., trading of financial instruments based on the received messages for orders, and other market activity related to the orders). For example, the user interface panel 320 may optionally display values of, and activity related to, financial instruments related to the order(s), including underlying assets and/or derivatives.

The manner in which user interface panel 320 displays information may also vary depending on other parameters. For example, the computational resources of the user devices connected via network 114 to the exchange computer system 110 can vary greatly, and the user interface panel 320 may be adapted for display on each particular user device based on parameters associated with that device (including screen size, display resolution, processing speed, and available bandwidth). For instance, a user operating a PC may benefit from display of a larger amount of information, whereas a user interacting with the exchange via a smart phone might benefit from a more streamlined presentation of information. As another example, where bandwidth or processing resources are limited, user interface panel 320 can be configured to display information in less resource-intensive ways (e.g., through simplified graphics and text).

One or more suitable types of user interface panel(s) 320 can be used to enter order information and additional information from a user. For example, inputs may be provided by a user as entries in fields (e.g., 330, 340, 340a, 340b), or as selections of buttons (e.g., 370) displayed within the graphical user interface. Alternatively, or in addition, the graphical user interface may be configured to pose a series of questions to the user, in which case inputs may be provided by the user through the graphical user interface as corresponding answers to the series of questions.

The application running on the 310 include volume field 350a that indicates a volume of the asset designated in the input field 330 traded and an amount field 350b that indicates an amount of currency of the asset to be traded in the input field 330. The application enables the user to input field 330 in terms of 350a or 350b.

A graph 360 may display values for an underlying asset of the order or bulk order for a period of time (e.g., 30 days, 60 days, 1 year). The graph 360 can be provided and displayed to the user interface panel 320. The user of the user device 310 may select additional display options (e.g., time windows, historical correlation data) for the graph 360. The graph 360 may display a series of values, e.g., prices, for an underlying asset over various time periods based on user customization.

A generate button 370 is provided and displayed on the user interface panel 320. After data has for the order(s) has been selected by the user via the user prompts, the generate button 370 may be used to transmit the data to the exchange computer system 110 via the network 114. A number of implementations have been described hereinabove. It should however be understood that various modifications may be made without departing from the spirit and scope of the disclosure. For example, various forms of the flows shown above may be used, with steps re-ordered, added, or removed. Accordingly, other implementations are within the scope of the disclosure and claims.

FIGS. 4A-B are flowcharts of examples of implementing MPT on the exchange computer system 110 of FIGS. 1-2. More specifically, FIG. 4A corresponds to the implementation of MPT illustrated in FIG. 5A. FIG. 4B corresponds to the implementation of MPT illustrated in FIG. 5B, and FIG. 4C corresponds to the implementation of MPT illustrated in FIG. 5C.

According to the method 400A, at operation 410, an exchange computer system receives, from a user device remote via a computer network, a first message related to an electronic security transaction order. In one example, the method 400A is implemented on the exchange computer system 110, described herein. For example, the message can be received at the ORS 132.

At operation 420, the exchange computer system determines, utilizing the order handling engine 136, a first time at which the first message is received by the order routing system from the user device. The first message can include data indicative of an order or bulk order. The first message can be routed to the order handlers and processed by the order handling engine 136, as described above.

The method 400A proceeds to operation 430. At operation 430, the exchange computer system applies a time stamp indicative of the first time to the first message. As noted above, the order handling engine 136, in some implementations, includes a clock that provides a time stamp to the first message. The time stamp can be formatted with data indicating a year, a month, day, and time. Time can be formatted in hours, minutes, seconds, and fractions of a second, such as microseconds ($\mu$s). In some implementations, a threshold processing time (MPT) can be stored in memory or storage of the exchange computer system during or before operation 430. The MPT can be utilized for processing any message related to an electronic security transaction order at the ORS 132, or order handling engine 136. In some implementations, the MPT can be determined based upon the slowest order handling processing time among a group of order handlers. For example, if a group of three order handlers have a processing time of 2 $\mu$s, 5 $\mu$s, and 7 $\mu$s, the MPT can be set at 7 $\mu$s, so that messages received at each of order handlers is processed within substantially the same time, i.e., 7 $\mu$s.

At or before operation 430, the MPT can also be applied to the electronic security transaction order, and indicate to the order handling engine to hold the electronic security transaction order for the MPT. In some implementations, a message containing the transaction order is held within the order handling engine 136, until the MPT is reached, and the message is forwarded to the matching engine 216 or to the OMS 134.

MPT can be determined by several different processes. For example, an operator can (1) a manually set the MPT on the exchange computer system, (2) or the MPT can be determined using one or more of a plurality of criteria. The exchange computer system monitors traffic, e.g., monitors the flow of messages and security transaction orders, and can determine the processing speeds of order handlers 218, and other components, such as the order handlers 218, matching engine 216, ORS 132, or OMS 134. The exchange computer system can group a subset of the order handlers 218 based on some criterion, such as overall activity level, activity level of each message type, volatility in the market, physical proximity to other order handlers, geographic origin of the messages, or based on types of devices that are transmitting messages, for example. The exchange computer system can determine an MPT utilizing one or more of the criteria and implement MPT on the subset of order handlers 218, matching engine 216, ORS 132, or OMS 134.

The method 400A continues to operation 440. At operation 440, the exchange computer system determines, using the order handling engine, whether a first time elapsed from the first time satisfies an MPT.

At operation 450, if the amount of time that has elapsed from the first time does not satisfy the MPT, the first message is blocked and is not forwarded to the matching engine 216, and/or the OMS 134. Instead, the message can be stored in a delay buffer coupled to or integrated with the order handler engine until the amount of time satisfies the MPT. If the first elapsed time from the first time does satisfy the MPT, the method 400A moves to operation 470.

In some implementations of operation 450, in response to determining that the first time elapsed from the second time does not satisfy the MPT, the method 400A blocks transmission of the second message until the time elapsed from the second time satisfies the MPT.

At operation 460, the method 400A continues by determining, utilizing the order handling engine 136, that a second elapsed time from the first time satisfies the MPT after blocking transmission of the first message. For example, the message remains in the order handler until the second time elapsed satisfies the MPT. The second elapsed time corresponds to a hold time, which is determined by the order handler. When combined, e.g., added to the first elapsed time, the MPT is satisfied.

In response to determining that the first time or second time elapsed from the first time satisfies the MPT, the exchange system transmits, utilizing the order handling engine 136, the first message to the matching engine at operation 470.

In some implementations, the method 400A may proceed differently when a bulk message is received. For example, at operation 410, the method 400A can proceed by applying, to a second message, a second time stamp indicative of the second time. In some cases, the first message can include a greater amount of data than second message, e.g., when the second message is a bulk message. The computer network involved in method 400A may be network 114, and can include a network of interconnected electronic devices, such as user devices 116, 118, 120, and 310.

Figure 5A:
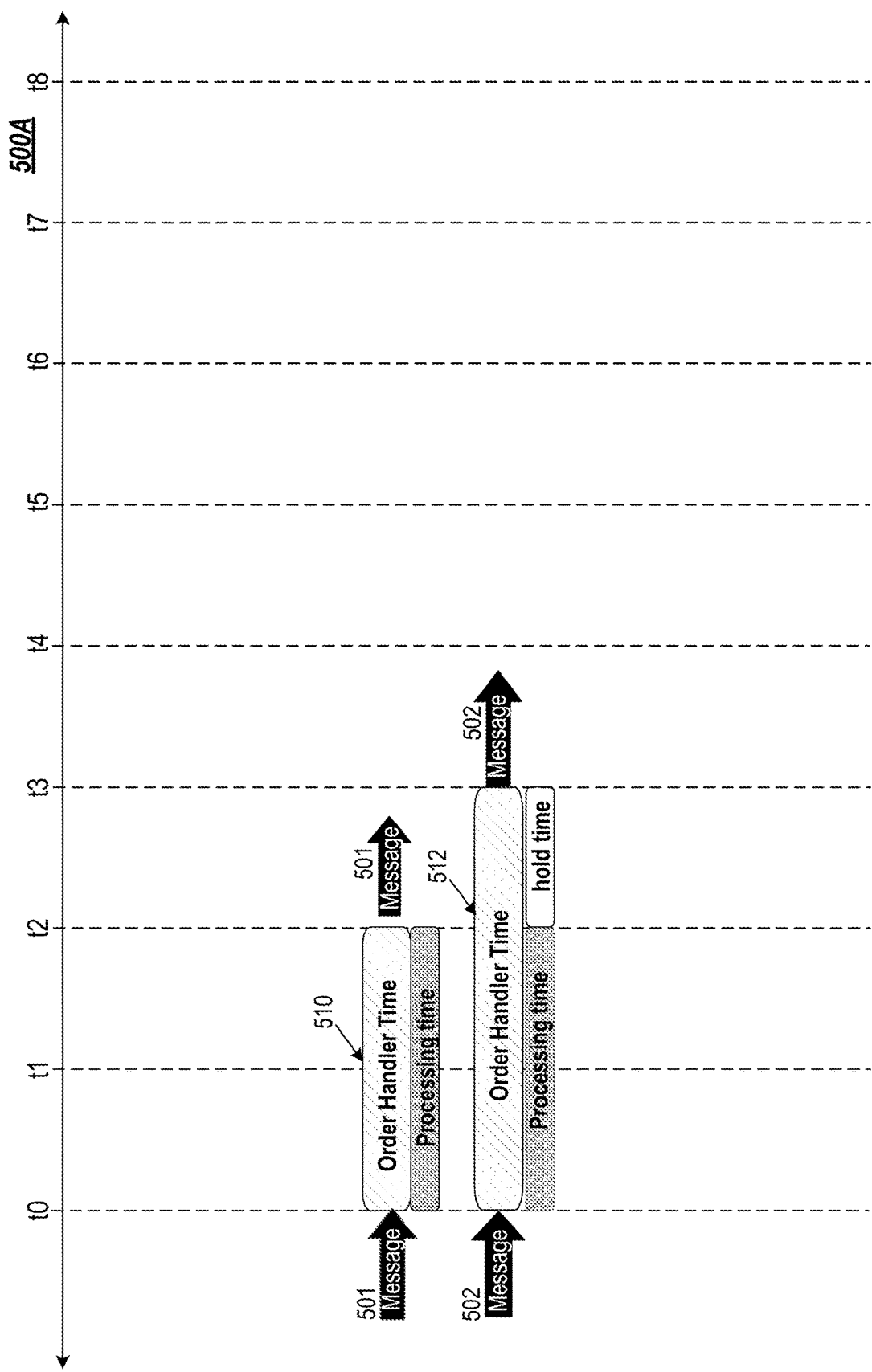
FIGS. 5A-C are graphs of timelines that illustrates how the exchange computer system of FIGS. 1-2 applies minimum processing time to received orders.
Figure 5B:
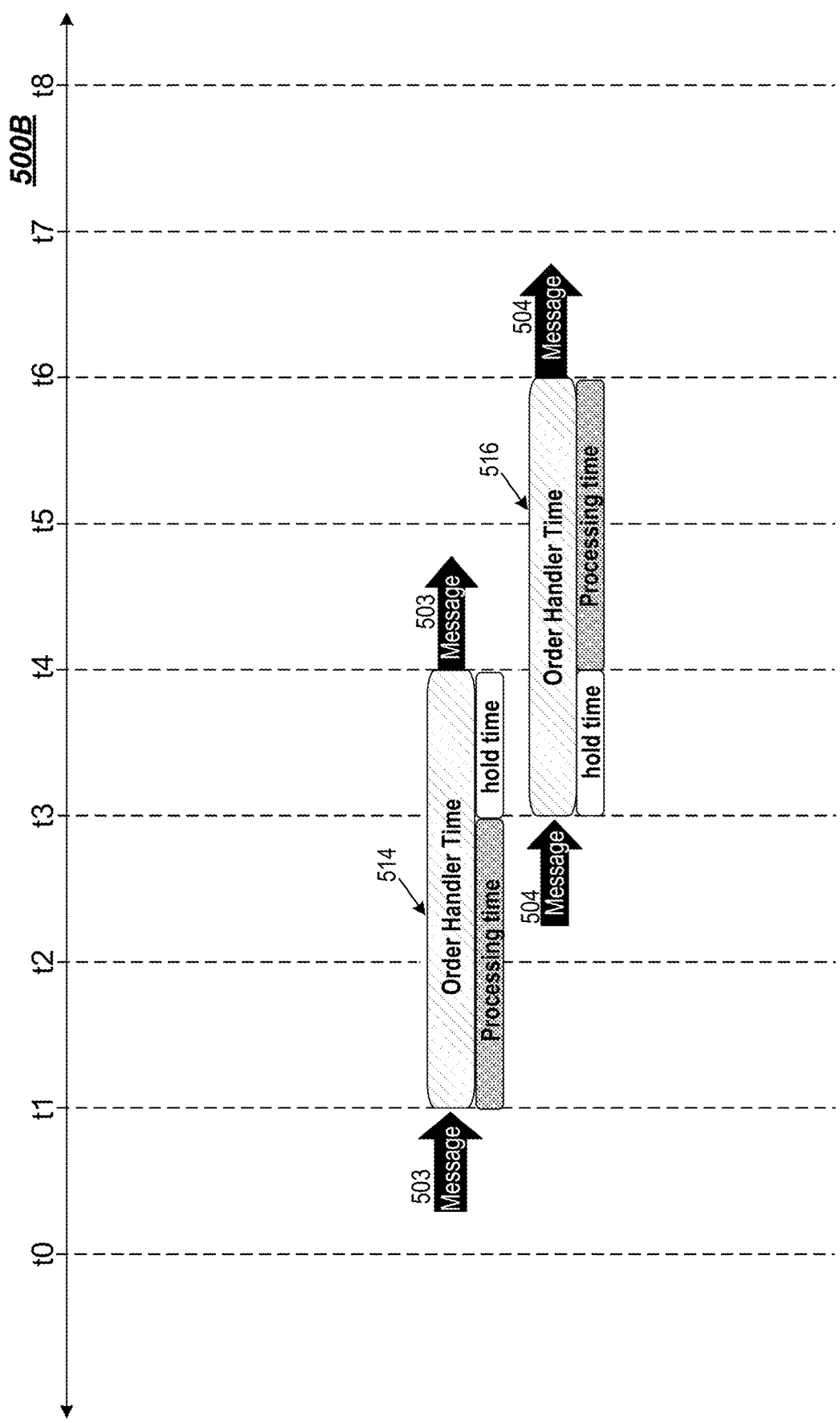
Figure 5C:
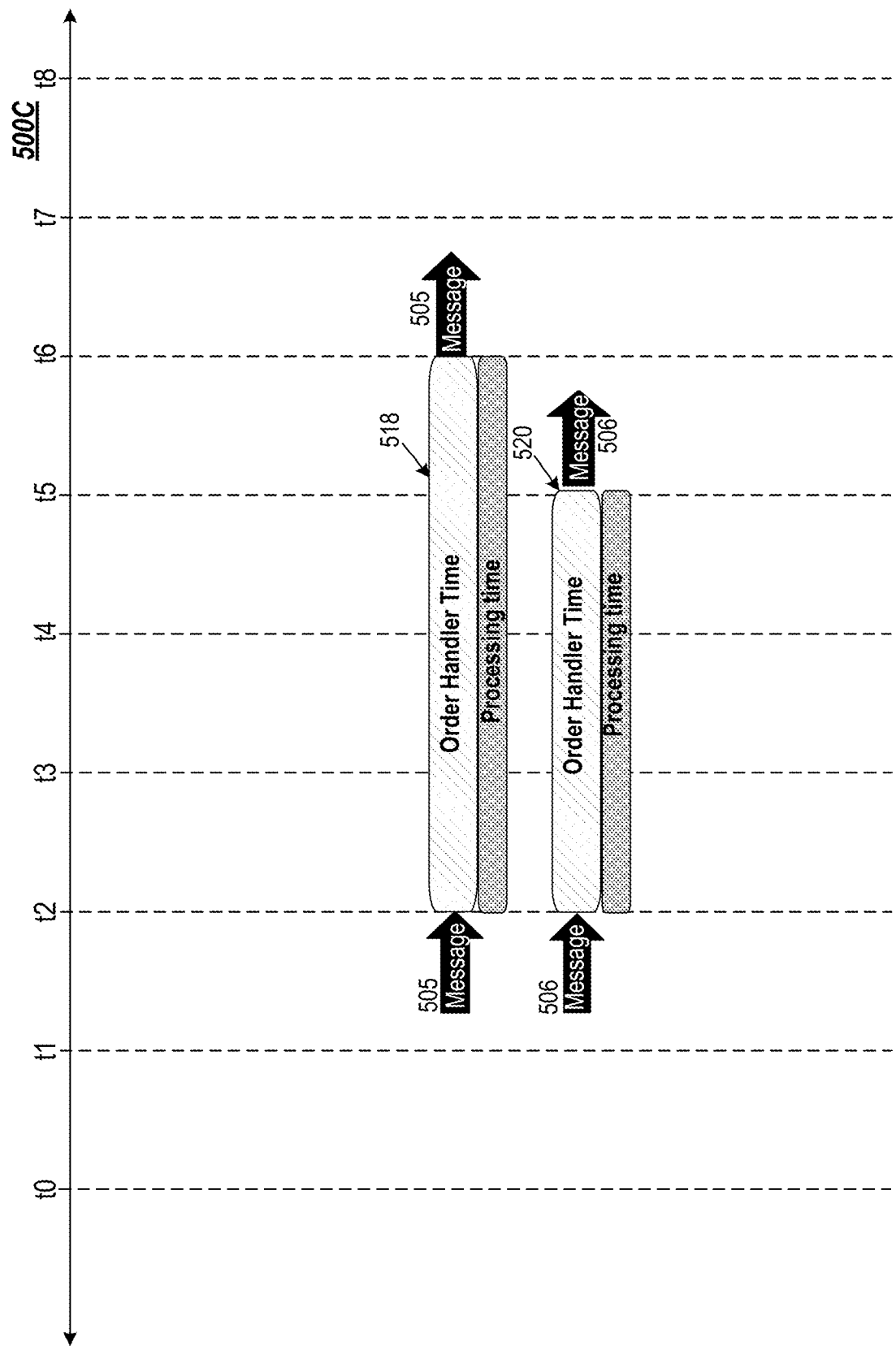

FIGS. 5A-C are graphs of timelines 500A-500C that illustrate how the exchange computer system of FIGS. 1-2 applies minimum processing time to received orders. The timelines 500A, 500B, and 500C illustrate messages 501, 502, 503, 504, and 506 that are subject to a minimum processing time by the order handlers. Each of the order handlers can be implemented as part of the order handling engine 136. In some implementations, the order handlers 512, 514, 516, and 520 can be implemented separately from the order handling engine 136, and in such implementations, can be electronically or communicatively coupled to the order handling engine 136. In FIGS. 5A-5C, each increment of time shown along the x-axis is 2 μs, e.g., the time between t1 and t2 is 2 μs, and the time between t6 and t7 is 2 μs.

In the example of FIG. 5A, an order handler may have a 4 μs processing time or order handler time 510, without utilizing MPT. To equalize processing times with other order handlers on the exchange computer system 110, the order handling engine 136 can apply a hold time. In one example, the 'slowest' order handler has a 6 μs processing time. Utilizing the method 400A or 400B and implementations described herein, the order handling engine adds a 2 μs hold time to the order handler time 510 such that the MPT and resulting order handler time 512 is 6 μs.

The flowchart of the method 400B and operations 415-475 that are shown in FIG. 4B are substantially the same as the method 400A and operations 410-470 shown in FIG. 4A. Turning to messages 503 and 504, illustrated in FIG. 5B, message 503 has arrived at an order handler. The order handler may have a 4 μs processing time or order handler time 514, when MPT is not implemented. Message 504 arrives at another order handler at clock time=t3. The order handler time 516 is also 4 μs, without implementing MPT. In this example, processing of the message 503, i.e., a first message, proceeds according to the method 400A. A second message, i.e., message 504 is processed according to method 400B. As shown, message 504 is received at an order handler having order handler time 516, which is 4 μs after message 503 is received at an order handler having order handler time 514.

The order handling engine 136 has determined an MPT of 6 μs. In this implementation, the hold time of 2 μs is added to the processing of message 503. Message 503 exists the order handler at clock time=t4, having an order handler with order handler time 514, while message 504 is still being processed at another order handler having order handler time 516. Order handling times 514 and 516 are shown separately and can be implemented on separate order handlers. Alternatively, the order handler times 514, 516 can be implemented on a same order handler. As detailed above, in some implementations, a single order handler can receive more than one message at different times, e.g., a current time, a prior time, and a next time.

Turning to FIG. 5C, in some implementations, the order handling engine 136 determines that a hold time does not need to be applied to an order hander, as explained above. For example, the method 400A can proceed from operation 440 to operation 470, and the method 400B can proceed from operation 445 to operation 475. In this example, handling of message 505 can be implemented as the first received message utilizing the method 400A or the second received method 400B. Likewise, message 506 can be processed utilizing the method 400A or the method 400B, since both message 505 and message 506 have arrived at their respective order handlers at substantially the same time (i.e., t2).

For example, message 505 enters an order handler that has an order handler time 518 that is greater than another order handler that has an order handler time 520. In this example, each of order handler times 518, 520 are greater than or equal to the MPT. For example, order handler time 518 is 8 μs, and order handler time 520 is 6 μs. In this example, the MPT is also 6 μs. With respect to order handler time 518, since the apply the MPT is exceeded, the order handling engine 136 does not apply a hold time. Message 506 enters the order handler that has the order handler time 520 of 6 μs. Since the order handler time 520 is equal to the MPT, the order handling engine 136 does not apply a hold time. In some implementations, messages 505 and 506 can be a same type or class of message. In other implementation, message 506 may be a bulk order, and message 505 can be a simple message, such that the instructions inherent to each message 505, 506 cause the difference in processing speeds. Similar to order handler times 514, 516, order handling times 518 and 520 can be implemented on separate order handlers, or alternatively, can be implemented on a same order handler In some implementations when processing a message in the return direction (e.g., a message sent from the order handler back to the user device), higher MPT values may limit throughput and increase observed lack latency on the exchange computer system, because the time that a message spends waiting for the MPT to the expire is not used to process messages in the return direction. However, when process return messages, implementing the hold time and final User Datagram Protocol (UDP) that are sent to the matching engine on a separate core, the exchange computer system may increase throughput and decrease observed lack latency.

Figure 6:
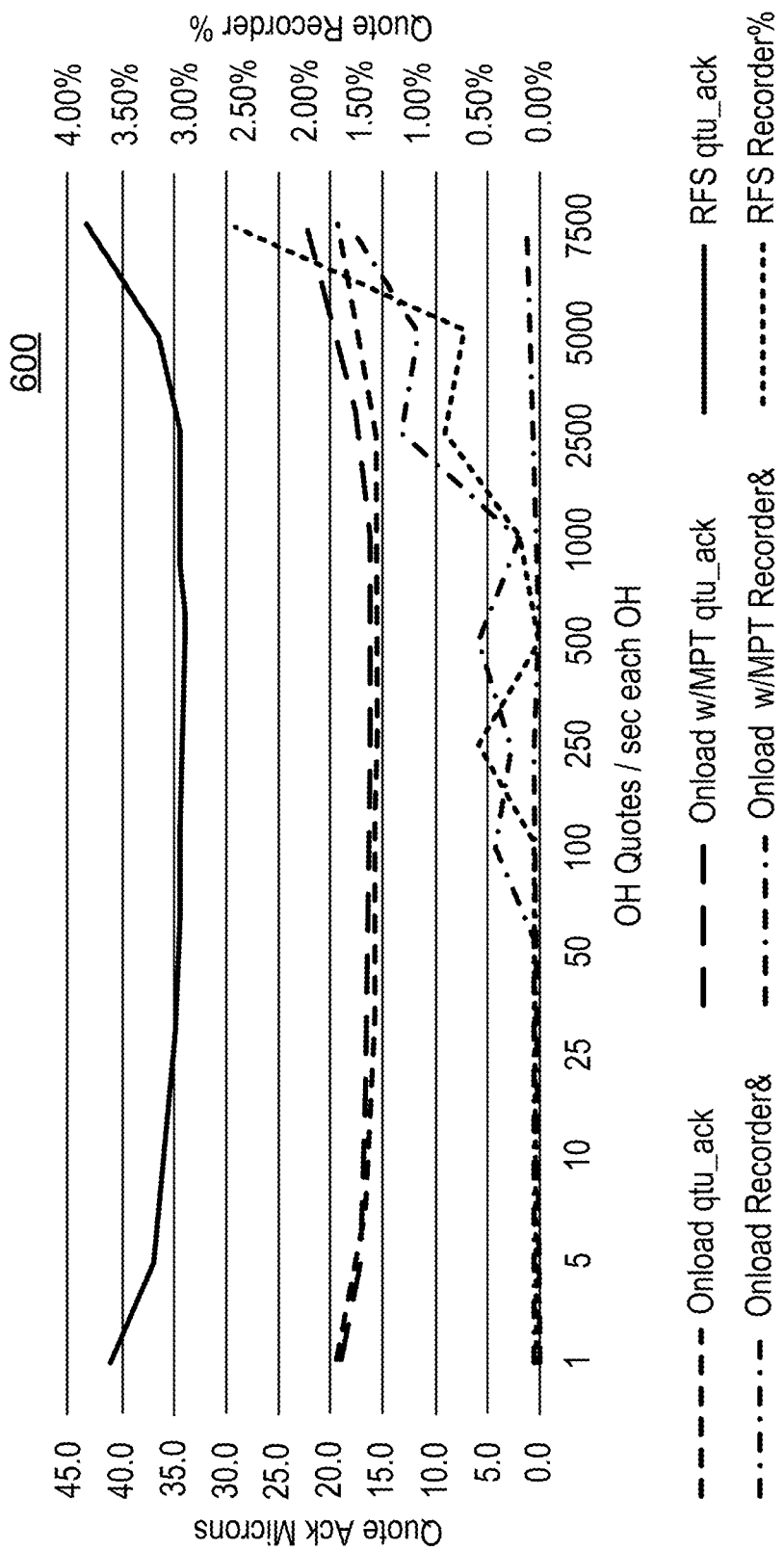
FIG. 6 is a graph illustrating how implementing minimum processing time affects latency and reordering of messages.

FIG. 6 is a graph 600 illustrating a percentage at which orders are reordered as a volume of orders increases according to the methods and systems disclosed herein. FIG. 6 also illustrates how MPT affects latency of quote acknowledgements. As indicated in the graph 600, when the exchange computer system receives single digit orders per second, there is nearly zero percent (0%) reordering of messages. As the exchange computer system approaches 7500 orders per second, the percentage or reordered messages is less than 0.5%, and in some instances can be less than about 0.25%. Without MPT, reordering of request for streaming (RFS) quotes approaches 2.5%, as the volume of RFS quotes received by the exchange computer system approaches 7500. Similarly, as the volume of online quotes approaches 7500 orders per second, between 1.5% and 2.0% of online quotes are reordered. Accordingly, implementing MPT can reduce the reordering of quotes by about 80% to about 50% in some implementations.

Figure 7:
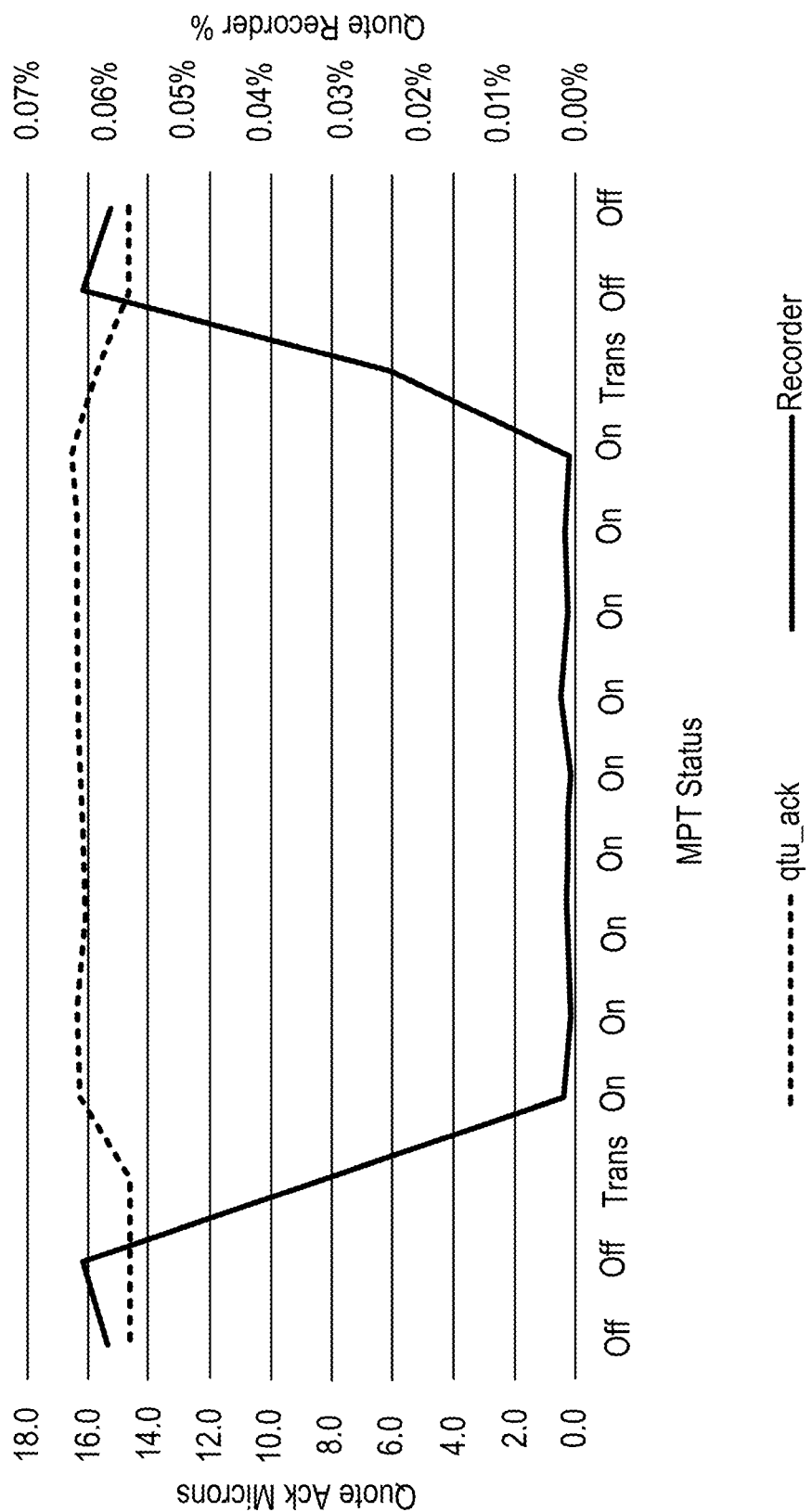
FIG. 7 is a graph illustrating how implementing minimum processing time affects message acknowledgement and reordering of messages.

FIG. 7 is a graph 700 illustrating quote acknowledgement and a percentage at which orders are reordered when MPT is implemented according to the methods and systems disclosed herein. As illustrated, before MPT is turned on, reordering of messages increases to around 0.06%. The graph 700 shows that when MPT is turned on, the processing time for messages increases by about 2 microsecs. For example, as shown, processing time increases from just over 14 microsecs to just over 16 microsecs. At the same time, the percentage of reordered messages or quotes drops to close to zero. When MPT is turned off again, the reordering of messages increases to around 0.06%, and the processing time drops to about 14 microsecs. Similarly, by implementing MPT as described, the percentage of reordered messages (e.g., quote acknowledgement) is less than 0.01%, and is also substantially zero (0), an improvement in message reordering of between about 80% to about 85%. Accordingly, FIGS. 6 and 7 graphically indicate how implementing a MPT can benefit an exchange computer system.

Implementations and all of the functional operations and/or actions described in this specification may be implemented in digital electronic circuitry, or in computer software, firmware, or hardware, including the structures disclosed in this specification and their structural equivalents, or in combinations of one or more of them. Embodiments may be implemented as one or more computer program products, e.g., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any form of programming language, including compiled or interpreted languages, and it may be deployed in any form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform actions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor can receive instructions and data from a read only memory or a random access memory or both.

Elements of a computer may include a processor for performing instructions and one or more memory devices for storing instructions and data. Generally, a computer can also include, or be operatively coupled to receive data from or transfer data to, or both, one or more mass storage devices for storing data, e.g., magnetic, magneto optical disks, or optical disks. However, a computer may not have such devices. Moreover, a computer may be embedded in another device, e.g., a tablet computer, a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, embodiments may be implemented on a computer having a display device, e.g., a cathode ray tube (CRT), liquid crystal display (LCD), or light emitting diode (LED) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Embodiments may be implemented in a computing system that includes a back end component, e.g., as a data server, or that includes a middleware component, e.g., an application server, or that includes a front end component, e.g., a client computer having the graphical user interface or a Web browser through which a user may interact with an implementation, or any combination of one or more such back end, middleware, or front end components. The components of the system may be interconnected by any form or medium of digital data communication, e.g., a communication network.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while actions are depicted in the drawings in a particular order, this should not be understood as requiring that such actions be performed in the particular order shown or in sequential order, or that all illustrated actions be performed, to achieve desirable results. Moreover, the separation of various system components in the embodiments described above should not be understood as requiring such separation in all embodiments, and it should be understood that the described program components and systems may generally be integrated together in a single software product or packaged into multiple software products.

Thus, particular embodiments have been described. The MPT disclosed herein, as implemented on the exchange computer system, is configured to reduce manipulative acts and practices, and to promote just and equitable principles of trade. Implementations of the MPT can remove impediments to, and improve the mechanism of a free and open market and a national market system. As such, the MPT advantageously protects investors and the public interest. Additionally, implementing the MPT on the exchange computer system can beneficially reduce what would otherwise be unfair discrimination that other systems that do not implement MPT may apply between customers, issuers, brokers, or dealers. Other embodiments are within the scope of the following claims. For example, the actions recited in the claims may be performed in a different order and still achieve desirable results.

What is claimed is:

1. A system comprising:
an order routing system configured to receive a first message from a user device over a computer network, comprising a network of interconnected electronic devices, the first message including data indicative of an electronic security transaction order;
an order matching system configured to match a buy side and sale side of a purchase or sale of an asset in the electronic security transaction order;
storage, configured to store data related to the first message;
an order handling engine configured to transmit the first message to the order matching system, the order handling engine configured to:
  receive, through the order routing system, the first message related to the electronic security transaction order;
  determine a first time at which the first message is received by the order routing system from the user device;
  apply a time stamp indicative of the first time to the first message;
  electronically group, into one set, a group of order handlers;
  determine processing speeds of each order handler in the group of order handlers;
  determine a slowest processing speed among the group of order handlers;
  determine a minimum processing time for an order handler by comparing a processing time of each order handler within the group of order handlers by monitoring a flow of messages and security transaction orders;
  adjust the minimum processing time in response to an increase or decrease in message level activity;
  store, in the storage, the minimum processing time for processing any message related to the electronic security transaction order at the order routing system;
  determine whether a time that has elapsed from the first time satisfies the minimum processing time;
  responsive to determining that the time elapsed from the first time does not satisfy the minimum processing time, block transmission of the first message until the time elapsed from the first time satisfies the minimum processing time;
  determine that a second elapsed time from the first time satisfies the minimum processing time after blocking transmission of the first message;
  transmit, the first message to the order matching system in response to the second elapsed time satisfying the minimum processing time;
  responsive to transmitting the first message utilizing the order routing system in real-time, match the electronic security transaction order in the first message to a second electronic security transaction order in a second message;
  responsive to matching the electronic security transaction order to the second electronic security transaction order, execute the electronic security transaction order in real-time; and
  responsive to executing the electronic security transaction order, transmit a return message, utilizing the order handling engine, to the user device.

2. The system of claim 1, wherein the first message includes a plurality of parameters comprising:
- a type of order; and
- quote information for the purchase or sale of the asset, and wherein the second elapsed time is a hold time that when added to the first elapsed time equals the minimum processing time.

3. The system of claim 1, wherein the slowest processing speed is utilized to determine the minimum processing time.

4. A non-transitory computer-readable storage medium comprising instructions, which, when executed by one or more computer processors in an exchange computer system, cause the one or more computer processors to perform operations comprising:
- receive, at a system from a user device, a first message related to an electronic security transaction order, the system comprising an order routing system, an order matching system, and order handling engine, and storage;
- determine, by the order handling engine, a first time at which the first message is received by the order routing system from the user device;
- apply, at the first message, a time stamp indicative of the first time;
- electronically group, into one set, a group of order handlers;
- determine processing speeds of each order handler in the group of order handlers;
- determine a slowest processing speed among the group of order handlers;
- determine a minimum processing time for an order handler by comparing a processing time of each order handler within the group of order handlers by monitoring a flow of messages and security transaction orders;
- adjust the minimum processing time in response to an increase or decrease in message level activity;
- store, in the storage, the minimum processing time for processing any message related to the electronic security transaction order at the order routing system;
- determine, at the order handling engine, whether a time that has elapsed from the first time satisfies the minimum processing time;
- responsive to determining that the time elapsed from the first time does not satisfy the minimum processing time, blocking transmission of the first message until the time elapsed from the first time satisfies the minimum processing time;
- determine, at the order handling engine, whether a second elapsed time from the first time satisfies the minimum processing time after blocking transmission of the first message;
- transmit, by the order routing system, the first message to the order matching system in response to the second elapsed time satisfying the minimum processing time;
- responsive to transmitting the first message utilizing the order routing system in real-time, match the electronic security transaction order in the first message to a second electronic security transaction order in a second message;
- responsive to matching the electronic security transaction order to the second electronic security transaction order, execute the electronic security transaction order in real-time; and
- responsive to executing electronic security transaction order, transmit a return message, utilizing the order handling engine, to the user device.

5. The storage medium of claim 4, wherein the first message includes a plurality of parameters comprise:
- a type of order; and
- quote information for purchase or sale of an asset.

6. A method comprising:
- receiving, at an exchange computer system from a user device remote to the exchange computer system and through a computer network, a first message related to an electronic security transaction order, wherein the computer network comprises a network of interconnected electronic devices, wherein the exchange computer system comprises an order handling engine, an order routing system, and storage, and the exchange computer system is configured to receive the electronic security transaction order through the computer network;
- determining, by the order handling engine, a first time at which the first message is received by the order routing system from the user device;
- applying, to the first message, a time stamp indicative of the first time;
- electronically grouping, into one set, a group of order handlers;
- determining processing speeds of each order handler in the group of order handlers;
- determine a slowest processing speed among the group of order handlers;
- determining a minimum processing time for an order handler by comparing a processing time of each order handler within the group of order handlers by monitoring a flow of messages and security transaction orders;
- adjusting the minimum processing time in response to an increase or decrease in message level activity;
- storing, in the storage, a minimum processing time for processing any message related to the electronic security transaction order at the order routing system;
- determining, by the order handling engine, whether a time elapsed from the first time satisfies the minimum processing time;
- in response to determining that the time elapsed from the first time does not satisfy the minimum processing time, blocking transmission of the first message until the time elapsed from the first time satisfies the minimum processing time;
- determining, by the order handling engine, whether a second elapsed time from the first time satisfies the minimum processing time after blocking transmission of the first message;
- transmitting, by the order routing system, the first message to the order routing system in response to the second elapsed time satisfying the minimum processing time;
  - responsive to transmitting the first message utilizing the order routing system in real-time, match the electronic security transaction order in the first message to a second electronic security transaction order in a second message;
  - responsive to matching the electronic security transaction order to the second electronic security transaction order, execute the electronic security transaction order in real-time; and
- responsive to executing electronic security transaction order, transmit a return message, utilizing the order handling engine, to the user device.

7. The method of claim 6, comprising:
  determining a type of order in the first message; and
  assigning a port and an order handler utilizing the determined type of order.

8. The method of claim 6, wherein the slowest processing speed is utilized to determine the minimum processing time.

* * * * *

UNITED STATES PATENT AND TRADEMARK OFFICE
CERTIFICATE OF CORRECTION

PATENT NO. : 12,182,867 B1
APPLICATION NO. : 18/623324
DATED : December 31, 2024
INVENTOR(S) : Paul Rose and Cole Michael Chmielewski Page 1 of 1

It is certified that error appears in the above-identified patent and that said Letters Patent is hereby corrected as shown below:

On the Title Page

Column 2, item (56) OTHER PUBLICATIONS, Line 1, please delete "Banerjeee" and insert therefor -- Banerjee -- and;

Column 2, item (56) OTHER PUBLICATIONS, Line 1, please delete "ptimized" and insert -- optimized -- and;

Column 2, item (56) OTHER PUBLICATIONS, Line 5, please delete "Schedulingof" and insert -- Scheduling of -- and;

In the Claims

Column 27, Line 6, Claim 2, after "first" please delete "elapsed".

Signed and Sealed this
Twenty-fifth Day of March, 2025

Coke Morgan Stewart
*Acting Director of the United States Patent and Trademark Office*